R. KNOLL.
PIPE COUPLING.
APPLICATION FILED NOV. 13, 1916.

1,318,674.

Patented Oct. 14, 1919.
2 SHEETS—SHEET 1.

WITNESSES:
Fredk. H. W. Fraentzel
Eva E. Desch.

INVENTOR:
Reinhold Knoll,
BY Fraentzel and Richards
ATTORNEYS.

R. KNOLL.
PIPE COUPLING.
APPLICATION FILED NOV. 13, 1916.

1,318,674. Patented Oct. 14, 1919.
2 SHEETS—SHEET 2.

WITNESSES:
Fredk. W. Frantzel
Eva E. Desch

INVENTOR:
Reinhold Knoll,
BY Frantzel and Richards
ATTORNEYS.

UNITED STATES PATENT OFFICE.

REINHOLD KNOLL, OF IRVINGTON, NEW JERSEY.

PIPE-COUPLING.

1,318,674.  Specification of Letters Patent.  Patented Oct. 14, 1919.

Application filed November 13, 1918. Serial No. 190,959.

*To all whom it may concern:*

Be it known that I, REINHOLD KNOLL, a citizen of the United States, residing at Irvington, in the county of Essex and State of New Jersey, have invented certain new and useful Improvements in Pipe-Couplings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in pipe or hose-couplings; and, the present invention has reference, more particularly, to a novel construction of coupling which is especially adapted for use with the ordinary gas-cock or fixture for connection thereto of a flexible gas-tube, but which is also well adapted in its use for the connection of two lengths of hose.

The present invention has for its principal object the production of a novel and simply-constructed coupling of the character hereinafter more fully set forth and for the purposes above stated, with which may be positively connected the end of a piece of tubing, hose, or the like, and which may be readily attached in its operative relation to the usual gas-cock, or may be of such construction, without departing from the scope of the present invention, that it may serve as a coupling for connecting the ends of two lengths of hose, or the like.

Other objects of the present invention not at this time more particularly enumerated will be clearly understood from the following detailed description of the present invention.

With the various objects of the present invention in view, the said invention consists, primarily, in the novel coupling hereinafter set forth; and, the invention consists, furthermore, in the novel arrangements and combinations of the several devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Similar characters of reference are employed in all of the said above described views, to indicate corresponding parts.

Figure 1:
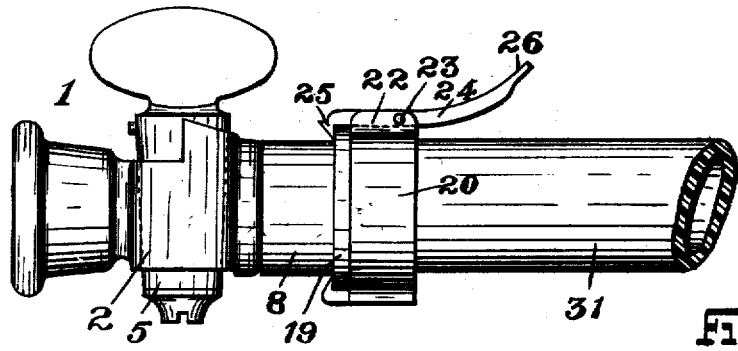
Figure 1 is a side elevation of the coupling, a gas-cock, and a portion of a piece of tubing, showing the several parts in their connected relation.

Referring now to Figs. 1 to 5 inclusive, the reference-character 1 indicates a suitable gas-cock, comprising a body 2 formed with a central duct or passage 3 and an internally screw-threaded socket-member, as 4, for attachment of the fixture 1 to the end of a gas-pipe, or the like. The said body 2, as is shown in the said figures of the drawings, may be provided with the usual shut-off or stop-plug, as 5, and upon its end-portion, opposite the said socket-member 4, the said body 2 is provided with an annular off-set or shoulder 6, and an externally screw-threaded part 7.

Figure 2:
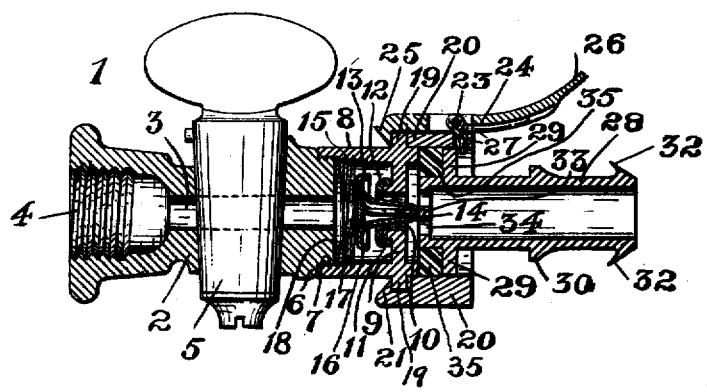
Fig. 2 is a longitudinal vertical sectional representation of the coupling and gas-cock.
Figure 3:
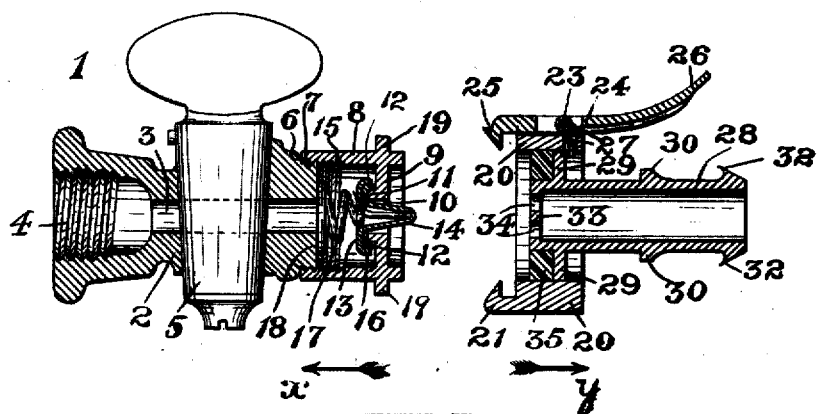
Fig. 3 is a similar sectional of the said parts, but showing the coupling and gas-cock in their disconnected relation.
Figure 4:
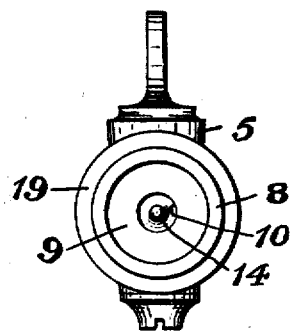
Fig. 4 is an end view of the gas-cock and the separated coupling-member attached thereto, looking in the direction of the arrow $x$ in said Fig. 3.
Figure 5:
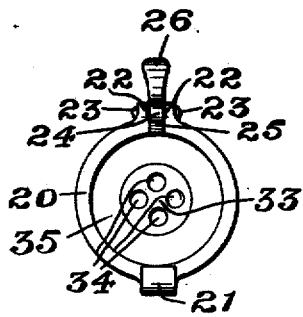
Fig. 5 is an end view of the other separated coupling-member, looking in the direction of the arrow $y$ in said Fig. 3.

The coupling comprises a member 8 formed at or near one end with a wall 9, which is centrally perforated, as at 10, the opening thus provided being preferably surrounded upon the inner face of the wall 9 by an annular projection 11, upon which is seated and which is surrounded by a correspondingly perforated ring or gasket 12 of a suitable resilient material, such as rubber or the like. The said ring or gasket 12, as will be evident, provides a seat for a suitably-formed valve, as 13, preferably made of sheet-metal and having a hollow stem 14 which is closed at its free end and extends into and is movably disposed in the perforated portions of the ring or gasket 12 and the wall 9. The opposite end-portion of the member 8 is open and is internally screw-threaded, as at 15, for screwing said member 8 upon the screw-threaded part 7 of the said body 2. That the said valve 13 will be properly seated upon the perforated ring or gasket 12, the valve is preferably provided with a marginal bead-like edge 16, as shown in Figs. 2 and 3 of the drawings, and a suitably coiled spring 17 is placed between the said valve 13 and the face-portion 18 of the screw-threaded portion of the body 2, said spring acting to close the valve down upon its seat when the coupling members are separated or disconnected, as will be clearly evident from an inspection of Fig. 3 of the drawings. As shown, the said member 8 is also provided, externally, with an annular rib or projection 19, the purpose of which will be presently more fully stated.

The reference-character 20 indicates a ring-like element which is provided at a suitable point with a marginal hook-shaped member 21, and opposite the said member 21 are a pair of perforated ears or lugs 22 which carry a pivot-pin 23. Pivotally mounted upon the said pin 23 is a locking-lever 24, formed with a hook-shaped end 25 and a fingerpiece 26, a coiled spring, as 27, being employed in connection with the pintle 23 and the lever 24 for normally forcing the said lever into its relative position represented in said Figs. 2 and 3 of the drawings. Suitably mounted within said ring-like member 20, by being screwed or otherwise secured within said member is an annular flange-like portion 29 of a tube 28, the said tube being provided with the usual tube-retaining annular flange, as 30, for holding in its position upon said tube the end-portion of the usual flexible gas-tubing 31. If desired, and as an extra precaution, at its end-portion, the said tube 28 may be provided with angularly disposed and sharp retaining hooks, as 32, on which the tubing 31 is slipped, and which embed themselves in the tubing to prevent the tubing 31 from being accidentally pulled off the said tube 28, as will be clearly evident. At its opposite end-portion, the said tube 28 is formed with a wall-portion 33 provided with a series of suitable holes or perforations, as 34, and mounted exteriorly upon the said end-portion of the tube 28 is a gasket or packing ring 35.

The manner of positively connecting the said ring-like element 20, and in consequence thereof the said tube 28 and its gas-tubing, to the coupling-member 8, and just as readily disconnecting the said parts, when desired, will be clearly understood from an inspection of said Figs. 1, 2 and 3 of the drawings, suffice it to say, however, that when the parts are connected, the gasket or packing ring 35 will make a gas-tight connection, and the wall-portion 33 will unseat the valve, so that when the gas-plug 5 is turned into its opened position, a continuous passage for the gas through the gas-fixture and the coupling into the flexible gas-tube will be produced.

Furthermore, it will be seen, that should the parts of the coupling become separated, the valve will automatically close so that there will be no escaping of the gas, although the gas-plug 5 has not been turned into its closed position.

Figure 6:
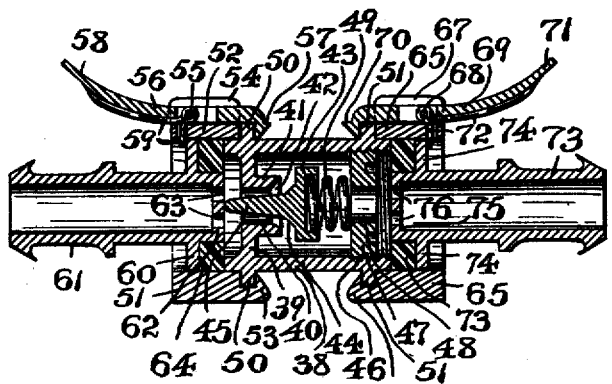
Fig. 6 is a longitudinal vertical section of a hose-coupling made according to and illustrating another embodiment of the principles of the present invention.
Figure 7:
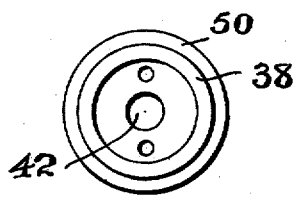
Fig. 7 is an end view of the central coupling-member of the form of coupling represented in said Fig. 6.

In Figs. 6 and 7 of the drawings, I have shown my present invention in the form of a coupling for connecting the end of two pieces of tubing or piping, as 36 and 37.

The coupling in this case consists, essentially, of a main tubular member or element 38 formed at or near one end with a wall 39, which is centrally perforated, as at 40, the opening thus provided being surrounded upon the inner face of the wall by an annular projection 41, formed with a valve-seat 42, upon which is adapted to be seated the cone-shaped portion 44 of a valve-disk 43. A stem 45 is also provided which extends from said cone-shaped portion 44 and projects into and is movably disposed in the said central perforation 40, herein-above mentioned. The opposite end-portion of the said member or body 38 is internally screw-threaded, as at 46, and screwed into said end-portion, so as to be positively fixed therein, is a disk or plate 47 which is also centrally perforated, as at 48. A suitable coil-spring, as 49, is disposed between the said valve-disk 43 and the said disk or plate 47. As shown, the said member or element 38 is also provided, externally, near its respective end-portions with a pair of annular ribs or projections 50 and 51.

The reference-character 52 indicates a ring-like element which is provided with a marginal hook-shaped member 53 and opposite the said member 53 are a pair of ears or lugs 54, said ears or lugs carrying a pivot-pin 55. Pivotally mounted upon said pin is a locking-lever 56 formed with a hook-shaped end 57 and a finger-piece 58, a coiled spring 59 being employed in connection with the pin 55 and the lever 56 for normally forcing said lever into its relative position represented in said Fig. 6. Suitably mounted within said ring-like member 38, by being screwed or otherwise secured within said member, is an annular flange-like portion 60 of a tube 61, for the attachment thereto, in any suitable manner, of the end-portion of a piece of hose or tubing. The said tube 61 has a wall-portion 62 provided with a series of holes or perforations 63, and mounted exteriorly upon said tube 61 is a suitable gasket or packing ring 64. The manner of connecting the said ring-like member 52 and the said tube 61, to the main coupling-member or element 38 is the same as that hereinbefore described in connection with the construction of the device illustrated in said Figs. 1 to 5 inclusive, and when attached in the manner illustrated in said Fig. 6, the action will be to unseat the valve-disk, the coil-spring 49 closing the valve, when the member 52 is disconnected from the main member 38.

Upon the other end-portion of the said member 38 is detachably mounted another ring-like member or element 65 provided with a marginal hook-shaped member 66 and a pair of perforated ears or lugs 67 which carry a pivot-pin 68. Pivotally mounted upon this pin 68 is a locking-lever 69 formed with a hook-shaped end 70 and a finger-piece 71, a coiled spring 72 being employed in connection with the pin 68 and the said lever 69 for normally forcing said lever into its relative position, represented in said Fig. 6. Suitably mounted within said ring-like member 65, by being screwed or otherwise secured therein, is an annular flange-like portion 74 of a tube 73 for attachment thereto, in any suitable manner, of the end-portion of another piece of hose or tubing.

The said tube 73 may also have an end-wall, as 75, provided with holes or perforations 76, but this perforated wall may be entirely dispensed with, if desired. The manner of connecting the said ring-like member or element 65 and tube 73 to the main coupling member or element 38 is also the same as that herein-before described in connection with the construction of the device illustrated in said Figs. 1 to 5 inclusive, and will be fully understood from an inspection of said Fig. 6. A gasket or packing ring 77 is also exteriorly mounted upon said tube 73.

I am fully aware, that changes may be made in the general arrangements and combinations of the various devices and parts, as well as in the details of the construction of the said parts, without departing from the scope of the present invention as set forth in the foregoing specification. Hence, I do not limit my present invention to the exact arrangements and combinations of the various devices and parts as described in the said specification, nor do I confine myself to the exact details of the construction of the said parts as illustrated in the accompanying drawings.

I claim:

1. In a coupling, a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a ring-like element adapted to be fitted over an end-portion of said body, a tube connected with said ring-like element, said tube being provided with a perforated end-wall having a portion in contact with the valve for unseating the same, and means connected with the said ring-like element for detachably connecting the same with the main tubular body.

2. In a coupling, a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a ring-like element adapted to be fitted over an end-portion of said body, a tube connected with said ring-like element, said tube being provided with a perforated end-wall having a portion in contact with the valve for unseating the same, said tube being also provided externally with an annular flange fitted within said ring-like element, a packing ring upon said tube between the said annular flange and the end of the main tubular body, and means connected with said ring-like element for detachably connecting the same with said main tubular body.

3. In a coupling, a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a projection upon the outer surface-portion of said body, a ring-like element adapted to be fitted over an end-portion of said body, a tube connected with said ring-like element, said tube being provided with a perforated end-wall having a portion in contact with the valve for unseating the same, said tube being also provided externally with an annular flange fitted with said ring-like element, a packing ring upon said tube between the said annular flange and the end of the main tubular body, a hook-shaped member extending from said ring-like element, and a locking-lever pivotally connected with said ring-like element, said lever being also provided with a hook-shaped member, said hook-shaped members of the ring-like element and said lever being adapted to be brought into detachable holding engagement with the projection of said main tubular body.

4. The comination with a gas-cock comprising a body having a central duct, a stop-plug, an internally screw-threaded socket-member, and an externally-screw-threaded end-portion, of a coupling consisting of a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a ring-like element adapted to be fitted over an end-portion of said body, a tube connected with said ring-like element, said tube being provided with a perforated end-wall having a portion in contact with the valve for unseating the same, and means connected with the said ring-like element for detachably connecting the same with the main tubular body.

5. The combination with a gas-cock comprising a body having a central duct, a stop-plug, an internally screw-threaded socket-member, and an externally-screw-threaded end-portion, of a coupling consisting of a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a ring-like element adapted to be fitted over an end-portion of said body, a tube connected with said ring-like element, said tube being provided with a perforated end-wall having a portion in contact with the valve for unseating the same, said tube being also provided externally with an annular flange fitted within said ring-like element, a packing ring upon said tube between the said annular flange and the end of the main tubular body, and means connected with said ring-like element for detachably connecting the same with said main tubular body.

6. The combination with a gas-cock comprising a body having a central duct, a stop-plug, an internally-screw-threaded end-portion, of a coupling consisting of a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a projection upon the outer surface-portion of said body, a ring-like element adapted to be fitted over an end-portion of said body, a tube connected with said ring-like element, said tube being provided with a perforated end-wall having a portion in contact with the valve for unseating the same, a hook-shaped member extending from said ring-like element, and a locking-lever pivotally connected with said ring-like element, said lever being also provided with a hook-shaped member, said hook-shaped members of the ring-like element and said lever being adapted to be brought into detachable holding engagement with the projection of said main tubular body.

7. The combination with a gas-cock comprising a body having a central duct, a stop-plug, an internally screw-threaded socket-member, and an externally-screw-threaded end-portion, of a coupling consisting of a main tubular body provided with a perforated wall, an inwardly extending annular flange surrounding the perforation in said wall, a gasket mounted upon said flange, a spring-controlled valve within said body, said valve being adapted to close the opening in said wall, comprising a base surrounded by a bead-shaped marginal edge-portion adapted to fit over and to be seated upon said gasket, and a guiding stem projecting from said base and extending into the perforation in said wall, a projection upon the outer surface-portion of said body, a ring-like element adapted to be fitted over an end-portion of said body, a tube connected with said ring-like element, said tube being provided with a perforated end-wall having a portion in contact with the valve for unseating the same, said tube being also provided externally with an annular flange fitted within said ring-like element, a packing ring upon said tube between the said annular flange and the end of the main tubular body, a hook-shaped member extending from said ring-like element, and a locking-lever pivotally connected with said ring-like element, said lever being also provided with a hook-shaped member, said hook-shaped members of the ring-like element and said lever being adapted to be brought into detachable holding engagement with the projection of said main tubular body.

In testimony that I claim the invention set forth above I have hereunto set my hand this 11th day of November, 1916.

REINHOLD KNOLL.

Witnesses:
FREDK. C. FRAENTZEL,
FREDK. H. W. FRAENTZEL.

Copies of this patent may be obtained for five cents each, by addressing the "Commissioner of Patents, Washington, D. C."